(12) United States Patent  
Sago et al.

(10) Patent No.: US 6,971,895 B2  
(45) Date of Patent: Dec. 6, 2005

(54) CONNECTOR ADAPTER WITH MEMORY FUNCTION UNIT

(75) Inventors: Masuyuki Sago, Tokyo (JP); Masanori Enomoto, Tokyo (JP); Susumu Imamura, Tokyo (JP); Yukie Ootaka, Tokyo (JP); Daisuke Koyama, Tokyo (JP)

(73) Assignees: Tokyo Communication Equipment MFG Co., Ltd., Tokyo (JP); NTT DoCoMo Inc., Tokyo (JP)

( * ) Notice: Subject to any disclaimer, the term of this patent is extended or adjusted under 35 U.S.C. 154(b) by 0 days.

(21) Appl. No.: 10/713,123

(22) Filed: Nov. 14, 2003

(65) Prior Publication Data

US 2004/0105325 A1    Jun. 3, 2004

(30) Foreign Application Priority Data

Nov. 15, 2002    (JP) ............................. 2002-332039

(51) Int. Cl.[7] ........................................... H01R 29/00
(52) U.S. Cl. ..................................... 439/188; 439/916
(58) Field of Search .................. 439/188, 916, 439/709, 710

(56) References Cited

U.S. PATENT DOCUMENTS 6,290,520 B2 *   9/2001   Otsu ........................... 439/188

FOREIGN PATENT DOCUMENTS

JP           2003-207686       *   7/2003

* cited by examiner

*Primary Examiner*—Javaid H. Nasri  
(74) *Attorney, Agent, or Firm*—Myron Greenspan, Esq.; Lackenbach Siegel, LLP

(57) ABSTRACT

A non-lock detector switch is provided on or near an adapter to be switched by a connector plug when the connector plug with memory function unit is coupled to the adapter having an antenna for accessing to the memory function unit. Accordingly, connection state of each connector can be directly and simultaneously detected by the switching operation of the detector switch at a time preceding a little from a time when the antenna detects the memory function unit just having closed to a position opposed to the antenna. This is useful for exactly and detecting without delay the complete coupling state of each one of a number of adapters in distinction from the incomplete coupling state of any one of adapters.

2 Claims, 5 Drawing Sheets

F I G. 5 A
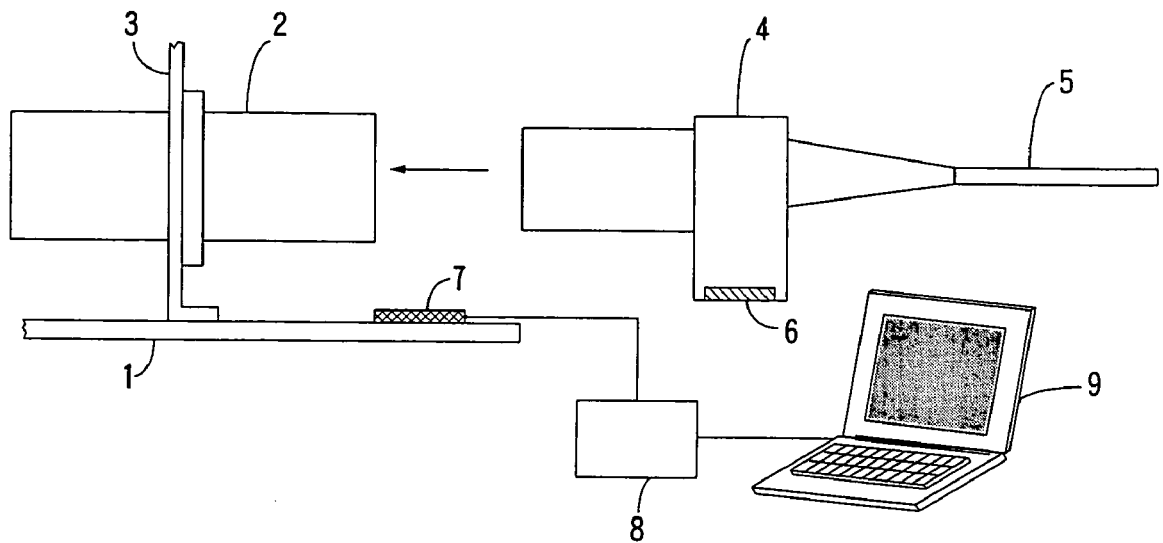
F I G. 5 B
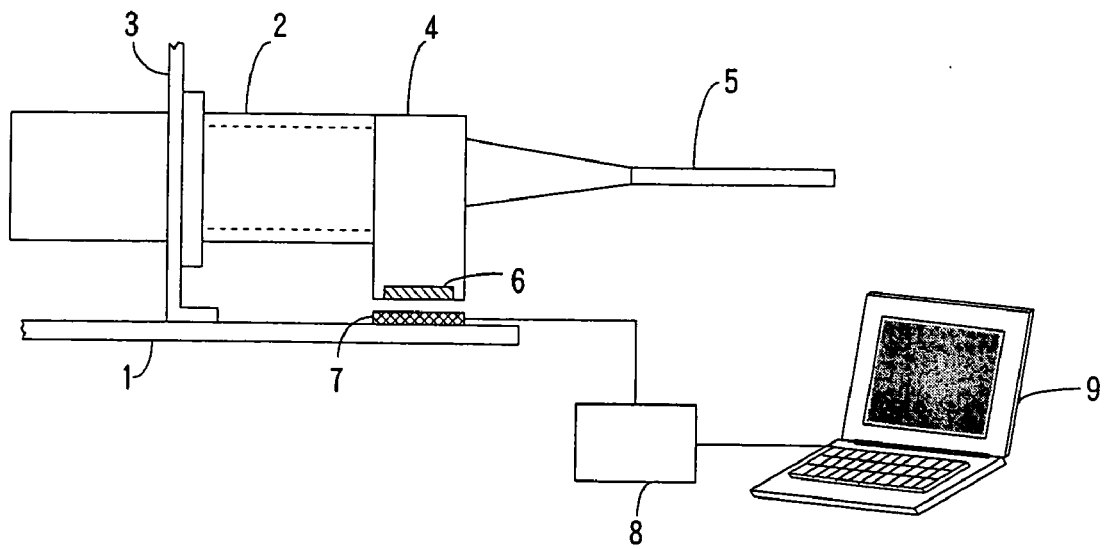

CONNECTOR ADAPTER WITH MEMORY FUNCTION UNIT

BACKGROUND OF INVENTION

The present invention relates to a connector adapter with memory function unit for control information.

On many conventional connectors, a label or a tape, on which optional letters or bar codes are recorded, is pasted for individual control information. In other examples, grouped control information, such as lot numbers or manufactured dates, is recorded.

In case of controlling production steps or mounting and wiring steps of optical connectors in these conditions, such control operations are usually performed by the use of computers. In this case, mistake such as erroneous understanding or erroneous inputting of control information shall be occasionally occurred, if letters are employed as the control information, since an operator performs the inputting operations in reading of the letters of control information.

On the other hand, in a case where the control information of bar code is recorded, read-in operations of control information are essential before and after a working operation step, while erroneous understanding or erroneous inputting of control information is especially reduced. However, if the read-in operation is overlooked at a working operation step, reliable control of this working operation step cannot be performed.

Moreover, when the control information is recorded on a label or a tape, each of the label and the tape has to have an appropriate size for recognize the control information. In this case where optical connectors carrying control information of these label and tape are accumulated on a distributing frame in a real application circumstance, the label itself becomes considerable obstacle for freely manipulation so that the convenience of operation using the control information of this type is disturbed.

Furthermore, if material of the label and the tape is of paper, the label and the tape may be damaged, so that the control information cannot be recognized and then controlled.

The inventors of the present application have filed a prior application for patent in Japan under a filing number of 2002-005642 titled "an optical connector with memory function unit", which have further filed as a PCT application under a filing number of PCT/JP03/00082. This optical connector with memory function unit comprises a memory function unit for storing identification information peculiar to respective optical connectors to be handled, so that individual control for each of the optical connectors can be readily and exactly carried out for each operation step. This improves effectively productivity and quality of products to obtain the convenience of operation using the control information of this type.

Examples of the optical connector with memory function unit proposed in the prior patent application are illustrated in FIGS. 5A and 5B. In FIG. 5A, a just preceding state when a connector plug is inserted into an adapter of the connector is illustrated, while a just succeeding state when a connector plug has been inserted into an adapter of the connector is illustrated in FIG. 5B. As illustrated in FIGS. 5A and 5B, the connector adapter 2 of the optical connector, to which one connection portion of an optical fiber cable 5, is supported, by the use of a holding board 3, on a supporting board 1, such as a printed circuit substrate. To the connector plug 4 of the connector, the other connector portion of the optical fiber cable 5 is connected and a memory function unit 6 is mounted. The memory function unit 6 is formed into an integrated circuit of untouchable type, which has been manufactured as an electromagnetic induction system applied to IC cards and IC fixed-term tickets developed as RFID (Radio Frequency Information Distributor) systems.

In order to perform a reading-out operation from and a writing-in operation into the memory function unit 6 on the optical connector plug 4, an antenna 7 is provided on or near the connector adapter 2 mounted on the supporting board 1, to which the connector plug 4 is connected with insertion coupling. A controller 8 is connected to the antenna 7 to control the reading-out operation from and the writing-in operation into the memory function unit 6. Into the memory function unit 6 on the connector plug 4, peculiar identification information (hereinafter referred to "peculiar ID") of the connector plug 4 is previously stored.

Accordingly, a grouped control for a plurality of manufacturing steps can be readily and exactly carried out, in a case where control information, such as lot numbers, manufactured dates or operation steps, and peculiar ID of products, which are stored in the memory function unit 6 of the connector plug 4, are read out by the controller 8 through the antenna 7 to a personal computer 9.

When connector plugs of the optical connectors with memory function units proposed by the prior application are applied to insert-couple, respectively, to a number of connector adapters arranged on a distributing frame, such as an exchange, it is necessary to obtain connection information representative of connection relationship between the connector plugs and the connector adapters in addition to position information of idle ones of the connector adapters.

In case of checking connection states of the connector plugs 4 from the side of the connector adapter 2, if one connector plug 4 is connected to the connection adapter 2, confirmation of the connection state of the connector plug 4 can be performed at once at the reading time of information of the memory function unit 6 by the antenna 7. However, if the connector plug 4 is not connected to the connection adapter 2, a little time is necessary for detecting by the antenna 7 this disconnection state of the connection plug 4.

Moreover, in a case where the connecter plug 4 is not completely inserted in the connector adapter 2 (i.e.: incomplete insertion), there will occur undesirable troubles, such as intermittent disconnection or interruption.

As mentioned above, in a case where the optical connector with memory function unit proposed by the prior application are applied to insert-couple, respectively, to a number of connector adapters arranged on a distributing frame, such as an exchange, if one connector plug 4 is connected to the connection adapter 2, confirmation of the connection state of the connector plug 4 can be performed at once at the reading time of information of the memory function unit 6 by the antenna 7. However, if the connector plug 4 is not connected to the connection adapter 2, a little time (e.g. 0.25 seconds) is necessary for detecting by the antenna 7 this disconnection state of the connection plug 4. Accordingly, when a great number of connection adapters (e.g. 1000 adapters) are arranged while a half number of connection adapters (i.e. 500 adapters) are idle ones, a time of about 125 seconds is necessary to read out the connection states thereof. This occurs considerable effect on the control operation in an urgent case.

SUMMARY OF THE INVENTION

An object of the present invention is to provide a connector adapter for coupling to a connector plug, which is provided with memory function unit for control information, thereby capable of checking within a high speed connection state of the connector adapter and the connector plug.

To attain the object and other objects of the present invention, there is proposed a connector adapter for coupling to a connector plug, which provides with memory function unit capable of untouchably performing, from the outside thereof, writing-in operation and reading-out operation of necessary control information. The connector adapter comprises an antenna for untouchably reading-out the control information from the memory function unit when the plug of the connector is coupled to the adapter; and a detector switch switched in case of the coupling operation of the connector plug to the connector adapter, said antenna and said detector switch being provided on or near the adapter.

The connector adapter of the present invention can be applied to an optical fiber connector and a metal wire connector.

BRIEF DESCRIPTION OF THE DRAWINGS

The present invention will be described in details below with reference to accompanying drawings, in which:

FIG. 5A is a typed view illustrating an adapter of the prior application, in which a plug to be coupled to the adapter and a monitor system is illustrated; and FIG. 5B is a typed view illustrating an adapter of the prior application, in which a plug coupled to the adapter and a monitor system is illustrated.

DETAILED DESCRIPTION OF INVENTION

Figure 1A:
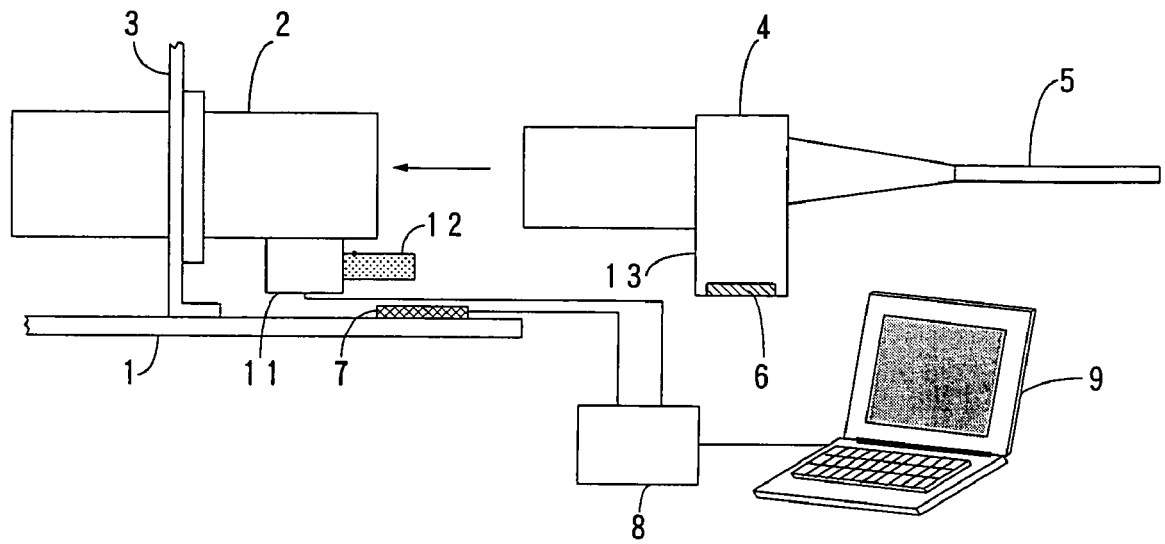
FIG. 1A is a typed view illustrating an example of a connector adapter of the present invention with memory function unit for control information, in which a plug to be coupled to the adapter and a monitor system for an antenna and a detector switch employed in the present invention are illustrated.
Figure 1B:
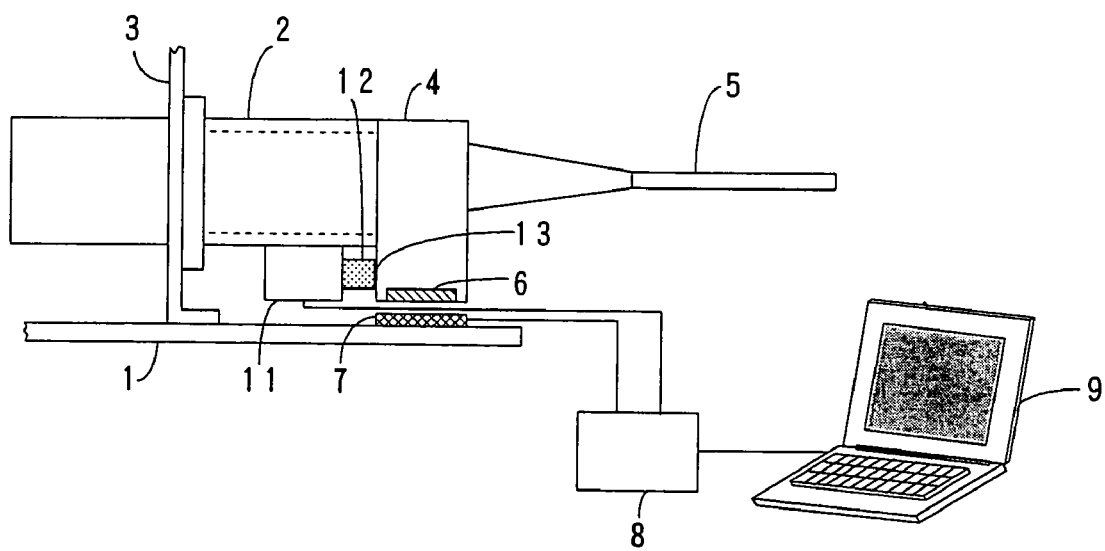
FIG. 1B a typed view illustrating an example of a connector adapter of the present invention with memory function unit for control information, in which a plug coupled to the adapter and a monitor system for an antenna and a detector switch employed in the present invention are illustrated.

An example of a connector adapter of the present invention with memory function unit for control information will be described with reference to FIG. 1A and FIG. 1B. FIG. 1A illustrates a preceding state from a coupling state of the adapter to a plug, and FIG. 1B illustrates the wireless transmission coupling state of the adapter to a plug. In this example of the present invention, a non-lock detector switch 11 is provided at the lower side of the adapter 2 so as to be switched by a controlled bar 12 of the detector switch 11 when the connector plug 4 is coupled to the adapter 2. In this case, the detector switch 11 is exactly switched when the memory function unit 6 of the connector plug 4 reaches an upside of the antenna 7 provided on a supporting board 1.

When a plug of the connector 4 is connected with insertion coupling to the adapter 2, the detector switch 11 is switched to the ON-state, so that the unconnected state of the adapter 2 is changed to the connected state in a controller connected to a personal computer 9. This change of connection state is stored in the controller 8.

The controller 8 is detecting always a connection state of whether or not the plug of the connecter 4 is connected with insertion coupling to the adapter 2. Therefore, there is no loss time to detect the connection state in comparison with a case where the connection state is detected, by the antenna 7 provided on the adapter 2, whether or not the memory function unit 6 provided on the connector 4 is positioned just upside of the antenna 7. A time necessary to detect a state where there is no memory function unit 6 at the upside of the antenna 7 can be effectively shortened. A switch, such as a micro switch, a limit switch, a contact-less switch and a photoelectric switch, etc., can be employed as the detector switch 11.

Figure 2:
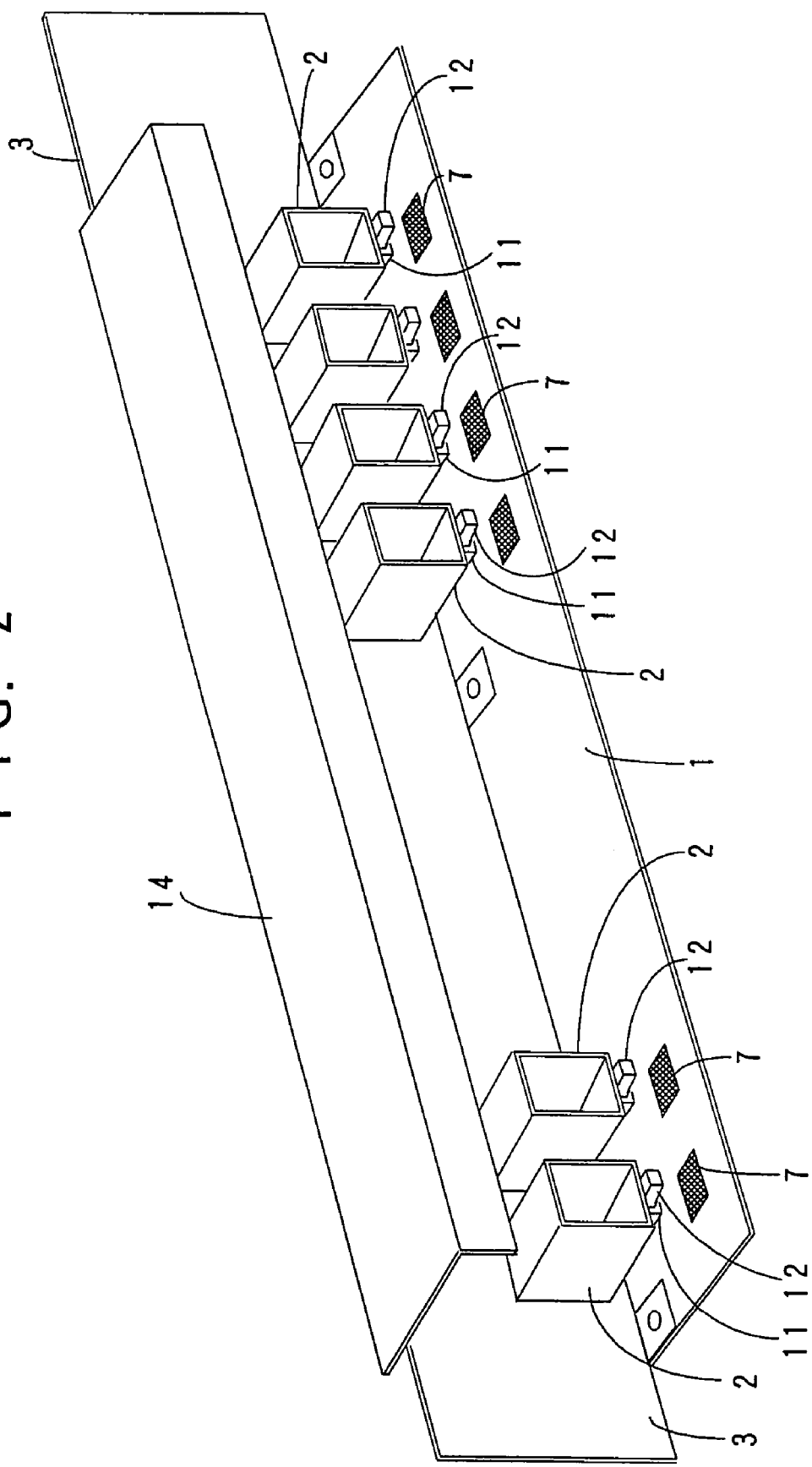
FIG. 2 is a perspective view illustrating a plurality of connector adapters of the present invention with memory function unit for control information, each of which is illustrated in FIGS. 1A and 1B.

FIG. 2 illustrates a part of a distributing frame 14 to which several tens to about one thousand of many adapters 2 are mounted to be each coupled to a connector plug of the optical connector 4. In this case, detection of an optional connection state of a connector plug of a specific connector 4 to a specific adapter 2, or detection of change of a connection state to a non-connection state can be exactly and swiftly performed.

Moreover, when the connector plug of the connector 4 is incompletely inserted to the adapter 2, this incomplete insertion can be exactly detected by non-switching of the detector switch 11 even if memory function unit 6 of the connector 4 is detected at the upside of the adapter 2.

In the example illustrated in FIG. 1 and FIG. 2, the detector switch 11 is positioned at the lower side of the adapter 2. However, this detector switch 11 can be positioned at the upside or lateral-side of the adapter 2 or on the supporting board 1.

Figure 3A:
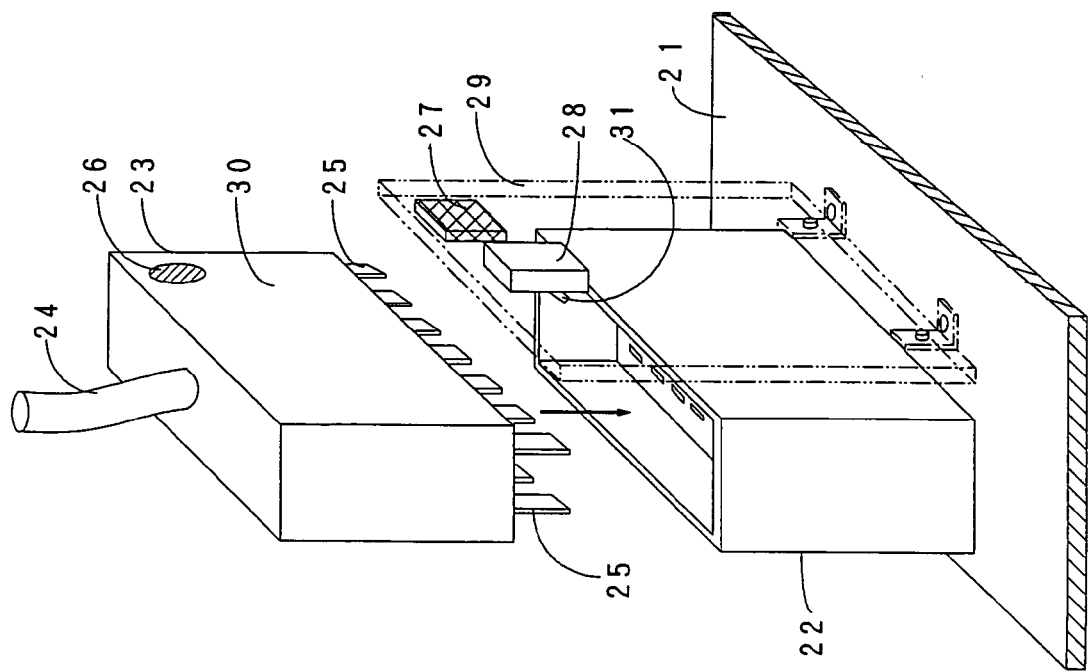
FIG. 3A is a perspective view illustrating an example of a connector adapter of the present invention, in which a plug of multi-core connector to be coupled to the adapter is illustrated.
Figure 3B:
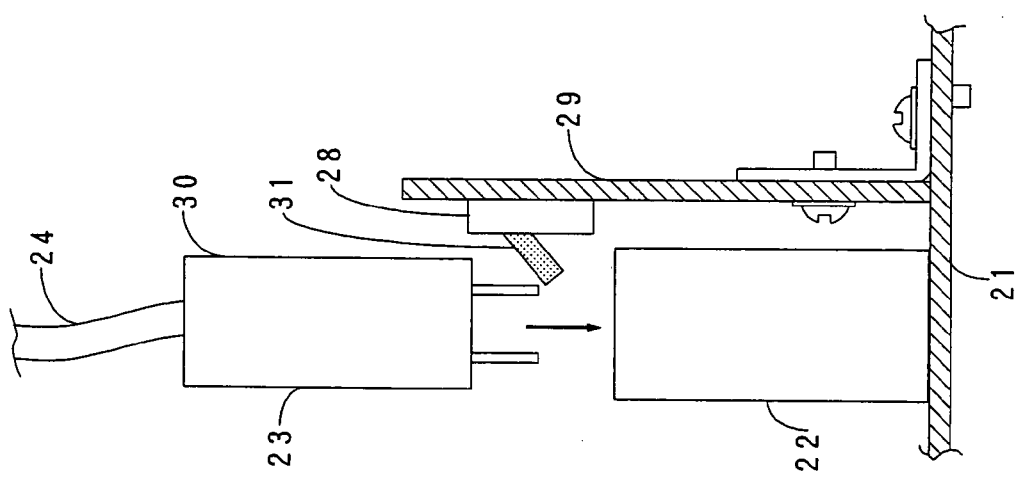
FIG. 3B is a side view illustrating an example of a connector adapter of the present invention, in which a plug of multi-core connector to be coupled to the adapter is illustrated.
Figure 3C:
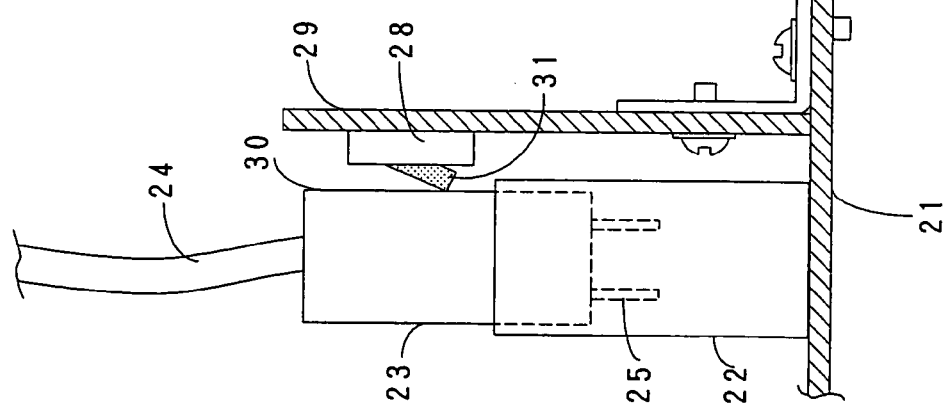
FIG. 3C is a side view illustrating an example of a connector adapter of the present invention, in which a plug of multi-core connector coupled to the adapter is illustrated.

With reference to FIG. 3A, FIG. 3B and FIG. 3C, another example of the present invention, in which an adapter coupled to a plug of multi-conductor connector connected to a multi-conductor metal-cable, is employed will be described. In this case, FIG. 3A is a perspective view illustrating an example of a connector adapter 22 of the present invention, in which a plug 23 of multi-core connector to be coupled to the adapter 22 mounted on a supporting board 21. FIG. 3B is a side view illustrating an example of the similar adapter 22 of the present invention. FIG. 3C is a side view illustrating an example of the similar adapter 22 of the present invention, in which a plug 23 of multi-core connector coupled to the adapter 22. A multi-conductor metal-cable 24 illustrated at the upper side thereof is connected to the plug 23 of the connector. A plurality of contacts 25 is mounted at the lower side of the plug 23 to be coupled to socket contacts mounted in the adapter 22. In FIG. 3A, a part of the socket contacts is illustrated. Moreover, a memory function unit 26 is mounted on the side portion of the adapter 22.

A holding plate 29 illustrated by chain lines is disposed on the supporting board 21 as to be close to the side portion of the adapter 22. On the holding plate 29, an antenna 27 and a detecting switch 28 are provided and connected to the controller 8 and the personal computer 9, etc. as illustrated in FIG. 1A and FIG. 1B. These connections to the controller 8 and the personal computer 9, etc. are omitted in FIG. 3A, FIG. 3B and 3C for abbreviation of illustration.

At a time when the plug 23 of the multi-core connector is coupled to the adapter 22, a lever 31 of the detecting switch 28 is pushed down in going down of the side portion 30 of the plug 23 of the multi-core connector, so that this coupling is detected in response to the turning-ON of the detecting switch 28. In other words, when the plug 23 of the multi-core connector is completely coupled to the adapter 22, the memory function unit 26 of the plug 23 of the multi-core connector is exactly opposed to the antenna 27 mounted on the supporting plate 29 while the detecting switch 28 is turned-ON.

Figure 4:
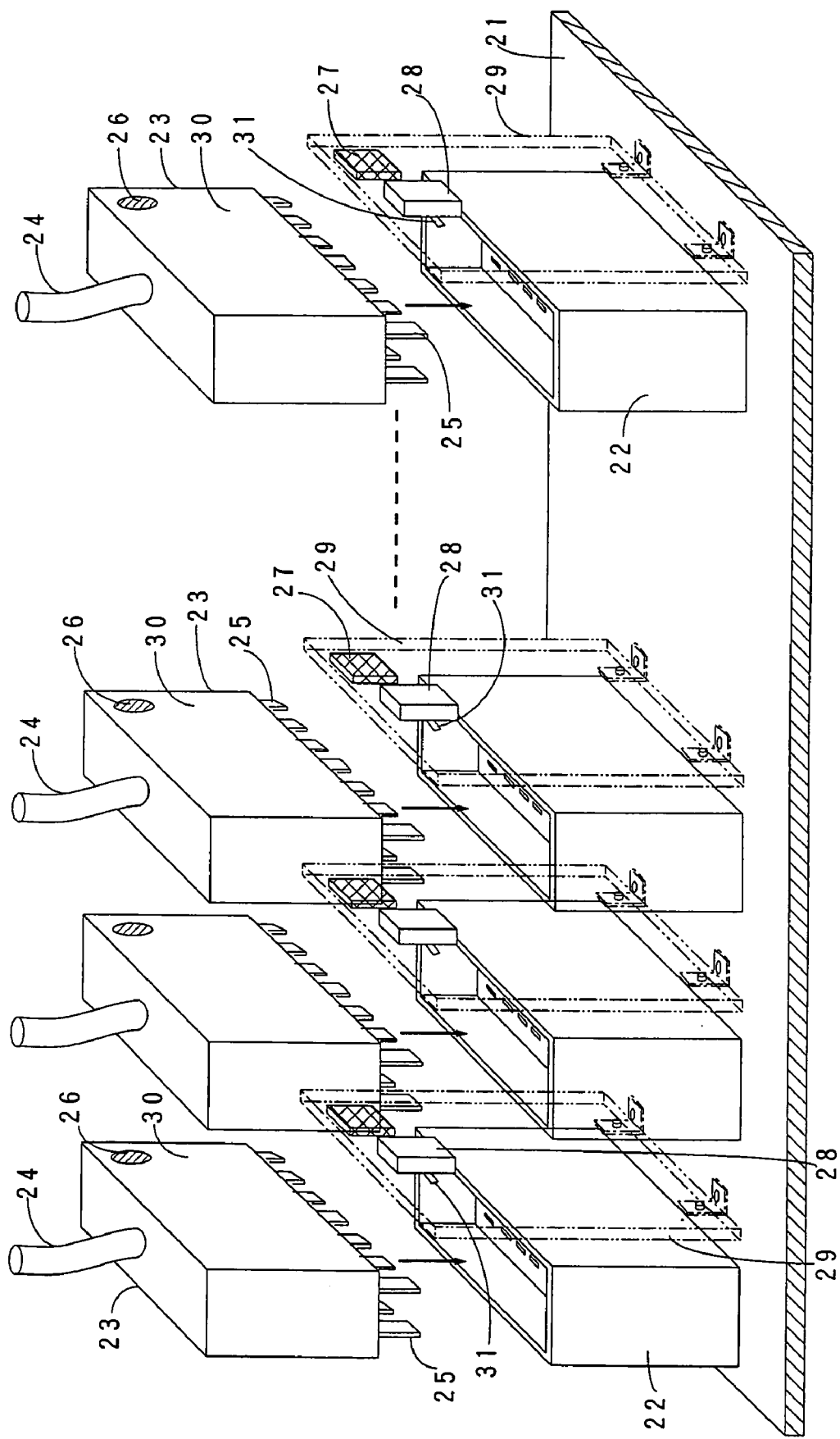
FIG. 4 is a perspective view illustrating examples of connector adapters of the present invention, in which a plurality of plugs of multi-core connector to be coupled, respectively, to the adapters is illustrated.

FIG. 4 illustrates, on the supporting board 21, a perspective view of a part of adapters 22, to which the plugs 23 of multi-core connectors connected to multi-core metal cables 24 are to be connected, respectively. By way of example, a selected one of the respective plugs 23 of multi-core connecters is connected to a specified one of the adapters 22 as requested in case of connection changing between communication circuits.

The multi-core connectors can be replaced with two-core connectors if the adapter 22 having the antenna 27 is modified in addition to the detecting switch 28 to match with the two-core cable. Moreover, the detecting switches 11 and 28 are can be employed for detecting the complete coupling in response to the change of the ON-state on the contrary to the above-mentioned change of the OFF-state to the ON-state.

As described in detail above, in the adapter of connector with memory function unit according to the present invention, a non-lock detector switch is provided on or near the adapter to be switched by the connector plug when the connector plug with memory function unit is coupled to the adapter. Accordingly, connection state of each connector can be directly and simultaneously detected by the switching operation of the detector switch at a time preceding a little from a time when the antenna detects the memory function unit just having closed to a position opposed to the antenna. This is useful for exactly and detecting without delay the complete coupling state of each one of a number of adapters in distinction from the incomplete coupling state of any one of adapters.

What we claim is:

1. A connector adapter for coupling to a connector plug, wherein said connector plug is provided with a memory function unit capable of performing operations of writing in and reading out necessary information, from an outside source by wireless transmission, and wherein said connector adapter comprises:
    an antenna for reading out control information from said memory function unit by wireless transmission when said connector plug is coupled to said connector adapter; and
    a detector switch for initiating said wireless transmission when said connector plug is coupled to said connector adapter, said detector switch being located on or near said connector adapter.

2. A connector adapter for coupling to a connector plug according to claim 1, wherein the detector switch is mounted on the connector adapter.

* * * * *